Figure 1:
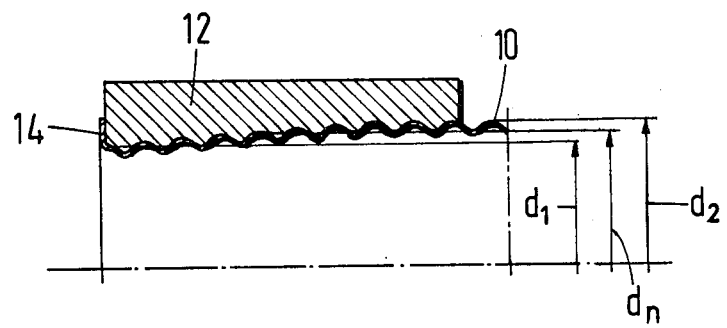

United States Patent [19]

Spinner

[11] 4,047,291

[45] Sept. 13, 1977

[54] METHOD OF RESHAPING TUBULAR CONDUCTOR SHEATH

[76] Inventor: Georg Spinner, Erzgiessereistr. 33, Munich 2, Germany

[21] Appl. No.: 643,629

[22] Filed: Dec. 23, 1975

Related U.S. Application Data

[63] Continuation of Ser. No. 494,998, Aug. 5, 1974, abandoned.

[30] Foreign Application Priority Data

Aug. 3, 1973 Germany .............................. 2339443

[51] Int. Cl.² ...................... H01P 11/00; H01R 43/00
[52] U.S. Cl. ....................................... 29/628; 333/34; 333/97 R; 339/177 R; 29/600
[58] Field of Search .................... 29/628, 600; 333/96, 333/97 R, 98 R, 33, 34, 35; 403/281, 282; 339/177 R, 177 E

[56] References Cited

U.S. PATENT DOCUMENTS

| | | | |
|---|---|---|---|
| 2,615,953 | 10/1952 | Waite | 333/34 X |
| 2,822,418 | 2/1958 | Dinnick | 333/97 X |
| 3,209,287 | 9/1965 | Oxner et al. | 333/34 |
| 3,373,243 | 3/1968 | Janowiak et al. | 333/96 X |
| 3,537,065 | 10/1970 | Winston | 339/177 R |
| 3,568,111 | 3/1971 | Dyer et al. | 333/97 |
| 3,579,282 | 5/1971 | Couper | 333/97 |
| 3,622,952 | 11/1971 | Hilbert | 339/177 R |

*Primary Examiner*—Victor A. DiPalma
*Attorney, Agent, or Firm*—Ostrolenk, Faber, Gerb & Soffen

[57] ABSTRACT

A clamping device for securing HF fittings to coaxial cables or hollow conductors by means of a clamping sleeve surrounding the cable outer sheath or the hollow conductor sheath. The sheath is radially inwardly deformed by the clamping sleeve in such a manner that a transformation is effected which guarantees a reflection-free transition to the adjoining fitting. In the end portion of the cable or hollow conductor the outer sheath is engaged radially so that it is compressed, giving a reliable hold. The cable sheath is thus deformed in a definite manner so that at the point of entry into the fitting it has a predetermined size, said deformation gradually or abruptly decreasing towards the cable in a transformation portion. This deformation can be effected by suitable means, for example axial tensioning or by a two-part clamping sleeve with tangential tensioning.

12 Claims, 3 Drawing Figures

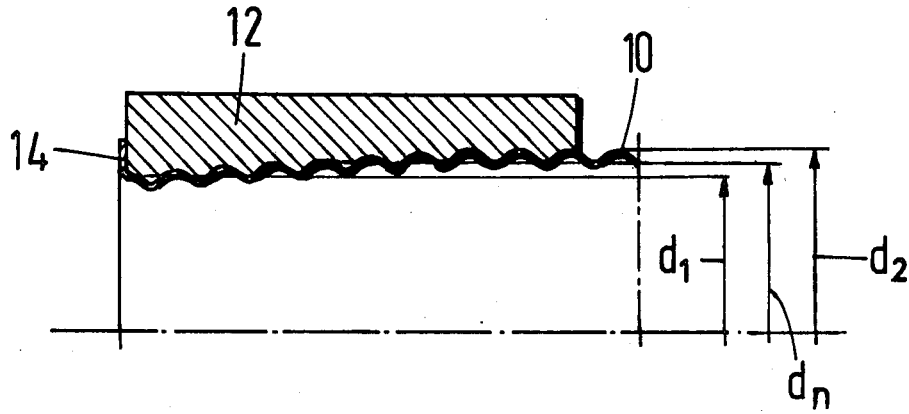

METHOD OF RESHAPING TUBULAR CONDUCTOR SHEATH

This is a continuation of application Ser. No. 494,998, filed Aug. 5, 1974 now abandoned.

The present invention relates to a clamping device for securing HF fittings to coaxial cables or hollow conductors by means of a clamping sleeve surrounding the cable outer sheath or the hollow conductor sheath.

Such clamping devices are made to match the nominal size of the sheath so that a mechanical securing and end-face contacting is effected at the flanged end of the sheath. The end-face contacting is produced by axial tensioning of the flanged end whilst the mechanical securing is generally effected independently thereof via a radially acting clamping device which exerts a radial pressure on the sheath. The connection of plug or connector fittings by means of such clamping devices is however frequently very problematical because the dimensions of the fitting can be made with great accuracy whereas the dimensions of the sheath of coaxial cables or hollow conductors are often very different from the nominal size. Since hitherto the clamping sleeve was always dimensioned to match the nominal size of the sheath, with tolerance deviations of the sheath diameter upwardly difficulties are encountered on fitting the clamping sleeve whereas when the cable diameter is smaller than the nominal size the mechanical securing is no longer adequate and an inaccurate and loose attachment inevitable. Furthermore, in the entire tolerance range a reflection point is produced because the compensation of the transition piece is designed for the upper tolerance outer dimension of the cable. Particular difficulties are encountered with securing to oval or elliptical corrugated sheaths.

The problem underlying the invention is to construct the clamping device in such a manner that excellent and reliable securing to all sheaths whose diameter is within the relatively large tolerance range is possible and no reflection point is formed.

According to the invention this problem is solved in that the sheath is radially inwardly deformed by the clamping sleeve in such a manner that a transformation is effected which guarantees a reflection-free transition to the adjoining fitting. In the end portion of the cable or hollow conductor the outer sheath is engaged radially so that it is compressed, giving a reliable hold. The cable sheath is thus deformed in a definite manner so that at the point of entry into the fitting it has a predetermined size, said deformation gradually or abruptly decreasing towards the cable in a transformation portion. This deformation can be effected by suitable means, for example axial tensioning or by a two-part clamping sleeve with tangential tensioning.

In cables with a plus size deviation in the end portion a gradual or abrupt tapering is produced. Said tapering continues in particular in the case of oval hollow conductors outside the clamping area and a satisfactory reflection adaptation is guaranteed up to the transition point.

According to a further development of the invention the clamping sleeve may be made conical on the inside, the portion coming to bear on the cable end having the smallest diameter which corresponds to the lowermost tolerance dimension of the cable, the opposite end having an internal diameter corresponding to the uppermost tolerance dimension of the cable. The clamping sleeve extends over an axial portion such that the clamping area of the cable or hollow conductor is only weakly conical, the clamping sleeve being made strong enough to enable the cable or hollow conductor to be deformed in such a manner that at the junction to the armature equal dimensions are obtained regardless of the diameter tolerances of the sheath.

According to the further development of the invention for corrugated circular coaxial cables with helical corrugation the clamping sleeve may be formed with a conical corrugated tube thread which produces a corresponding deformation when the clamping sleeve is screwed onto the cable.

Alternatively, the rigidly formed sleeve smooth on the inside can be pushed by a device axially onto the cable, thereby conically deforming said cable. The flanging of the cable end portion may be effected directly onto the ring or clamping sleeve.

When using the clamping device for a coaxial cable, according to a further development of the invention an insertable conical clamping means may also be provided for the inner conductor, said means widening said conductor to the correct dimension. The length of the conical clamping means is such that it is long compared with the mean operating wavelength to ensure reflection-free tapering.

According to a further development of the invention the clamping sleeve is formed over an axial length of $\lambda/4$ cylindrically or in the shape of elliptical or oval cylinder so that a constant cross-section is retained over this length. With the resulting deformation over an axial length corresponding to one quarter of the mean operating wavelength the step error can be reduced to half. The clamping sleeve may then consist merely of the cylindrical portion or said cylindrical portion may be followed by a conical portion possibly having a corrugated tube thread. For fittings for cables and hollow conductors having annular corrugations the clamping sleeve is best made split and the tensioning is in the tangential direction. The deformation may be effected at certain points via resilient media.

Temperature-dependent changes in the cable may be compensated for by corresponding temperature-dependent deformation members within the fitting.

According to a further development of the invention the clamping sleeve of the fitting is provided with adjusting screws which press from outside against the cable or against the hollow conductor to deform the metal sheath of the cable to permit better adaptation.

Figure 2:
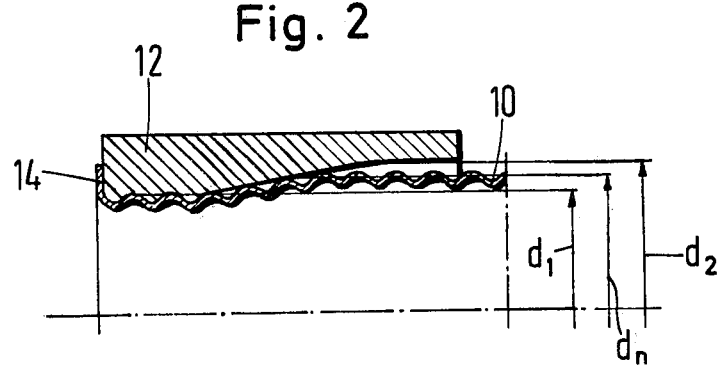
Figure 3:
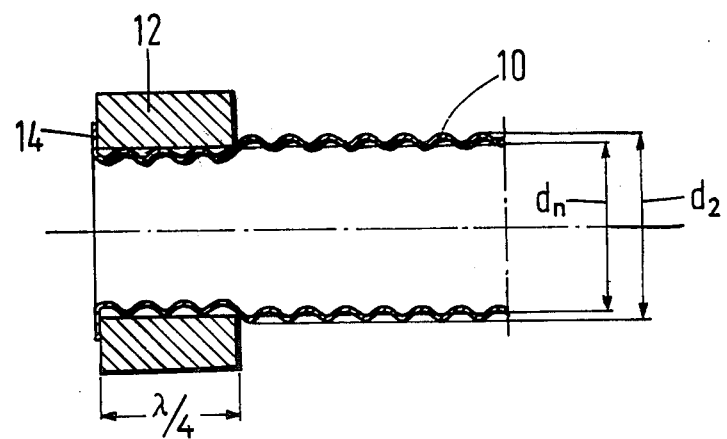

Some examples of embodiment of the invention will be explained hereinafter with reference to the drawings, wherein:

FIG. 1 is a sectional view of a conical clamping sleeve fitted to a corrugated sheath, FIG. 2 is a sectional view corresponding to FIG. 1 of a clamping sleeve with cylindrical end portion, FIG. 3 is a sectional view of a cylindrical clamping sleeve.

The examples of embodiment illustrated in the drawings show diagrammatically the fixing of various clamping sleeves on a corrugated sheath 10. This may the outer sheath of a coaxial cable or a hollow conductor. The sheath may be circular, elliptical or oval. The application of the invention is not restricted to clamping devices for corrugated sheaths but can also be used for smooth sheaths. However, the invention is particularly important in conjunction with corrugated sheaths because in the latter the tolerance deviations are particularly high.

In the embodiment of FIG. 1 the clamping sleeve 12 is provided with a conical inner thread which in the front end portion where the end 14 of the sheath 10 is flanged has a diameter corresponding to the lowermost tolerance dimension whereas the opposite end has a diameter corresponding to the uppermost tolerance dimension. The diameter $d_1$ represents the lowermost tolerance dimension of the cable outer diameter, the diameter $d_n$ the nominal outer diameter and the diameter $d_2$ the outer diameter having the uppermost tolerance dimension. This conical arrangement guarantees that the sheath is compressed down to the smallest tolerance dimension (if it is not already this size due to its own minus tolerance).

It is thus always guaranteed that the sheath has a predetermined dimensioning at the point of entry into the fitting.

Alternatively, the clamping sleeve according to FIG. 1 may be provided with a smooth internal cone effecting a corresponding compression of the outer sheath. Such a smooth internal cone is substantially simpler to make than a conical corrugated thread. The sheath may be axially inserted into said smooth internal cone and is compressed together radially inwardly via the undulation peaks.

In the example of embodiment according to FIG. 2 the clamping ring 12 is equipped on the inside at the front end with a cylindrical threaded portion. Said cylindrical threaded portion, which is relatively simple to make and has the lowermost tolerance dimension, again effects a definite compression of the cable and excellent securing. Adjoining the cylindrical front portion is a smooth conical transformation portion which terminates in a cylindrical rear portion whose internal diameter corresponds to the uppermost tolerance dimension. In the example of embodiment illustrated the sheath 10 has substantially the nominal diameter and in the front portion of the clamping sleeve is compressed down to the lower tolerance dimension.

In the example of embodiment according to FIG. 3 the clamping sleeve is in the form of a cylindrical ring 12 of length $\lambda/4$ of the mean operating wavelength, the internal diameter $d_n$ corresponding to the nominal dimension. The corrugated sheath compressed in the ring portion widens abruptly outwardly from said portion, giving a transformation step.

What I claim is:

1. A method of reshaping a tubular conductor sheath or the like, comprising:
    providing a conductor sheath or the like having a first, normal, external diameter; providing a clamping sleeve having an opening with an inside diameter that is smaller than the sheath normal diameter;
    moving an end of the sheath or the like into and through the sleeve opening and by such movement radially deforming the sheath or the like inwardly to effect a transformation which permits a reflection free transition to an adjoining fitting or the like.

2. The method of claim 1, further comprising passing the end of the sheath or the like completely through the sleeve opening.

3. The method of claim 2, wherein the sleeve opening has an axial length of $\lambda/4$ of the mean operating wavelength of the signal carried on the conductor sheath or the like.

4. The method of claim 2, wherein the sleeve opening is surrounded by and defined by a corrugated thread; said passing of the sheath or the like, through the sleeve opening comprising screwing it in over the corrugations in the sleeve opening.

5. The method of claim 4, wherein the clamping sleeve inside tapers conically to the smaller diameter and the sheath end is passed into the sleeve through its wider end toward its narrower end.

6. The method of claim 2, further comprising moving the end of the sheath or the like through and beyond the sleeve and folding open the end of the sheath against the sleeve to define a flange.

7. The method of claim 2, wherein the clamping sleeve inside tapers conically to the smaller diameter and the sheath end is passed into the sleeve through its wider end toward its narrower end.

8. The method of claim 7, wherein the length of the sleeve is selected with reference to the operating frequency of the sheath, or the like, to obtain reflection-free tapering.

9. The method of claim 1, wherein the clamping sleeve inside tapers conically to the smaller diameter and the sheath end is passed into the sleeve through its wider end toward its narrower end.

10. The method of claim 9, wherein the sleeve opening is threaded near its narrower end and is smooth on its conical portion and the sheath or the like is corrugated; passing the sheath, or the like to the sleeve opening narrower end and over the corrugations at that end.

11. The method of claim 10, further comprising passing the end of the sheath or the like completely through the sleeve opening.

12. The method of claim 11, further comprising moving the end of the sheath or the like through and beyond the sleeve and folding open the end of the sheath against the sleeve to define a flange.

* * * * *